Patented Jan. 5, 1954

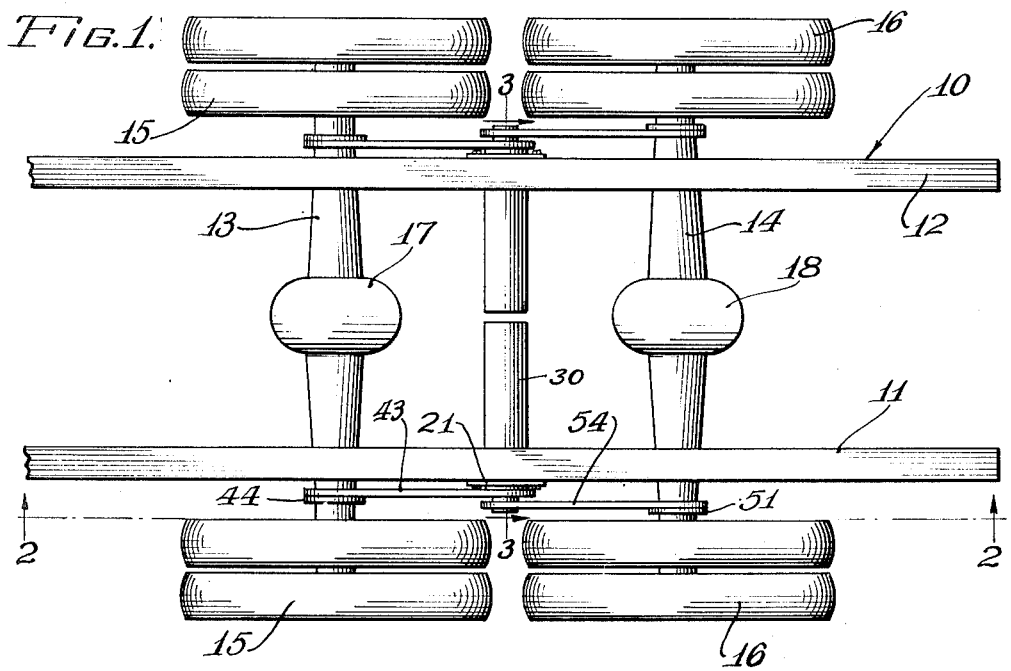
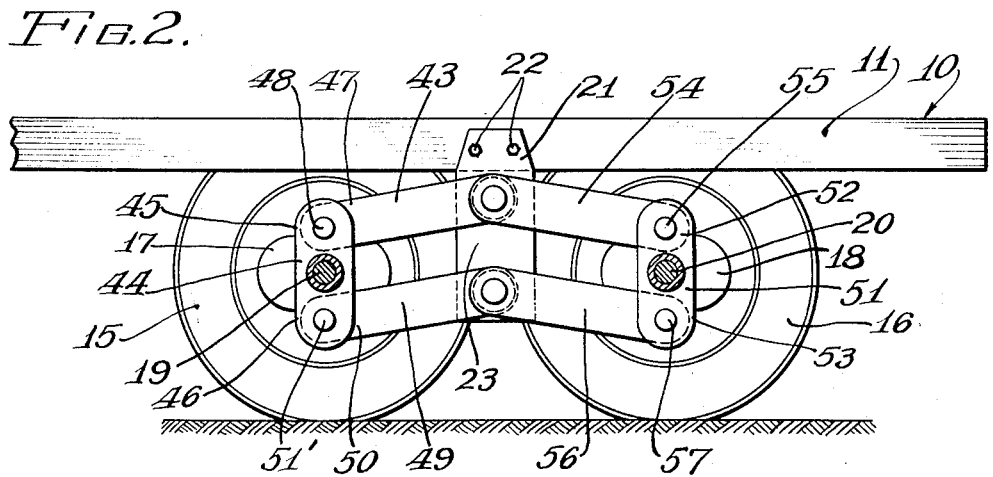

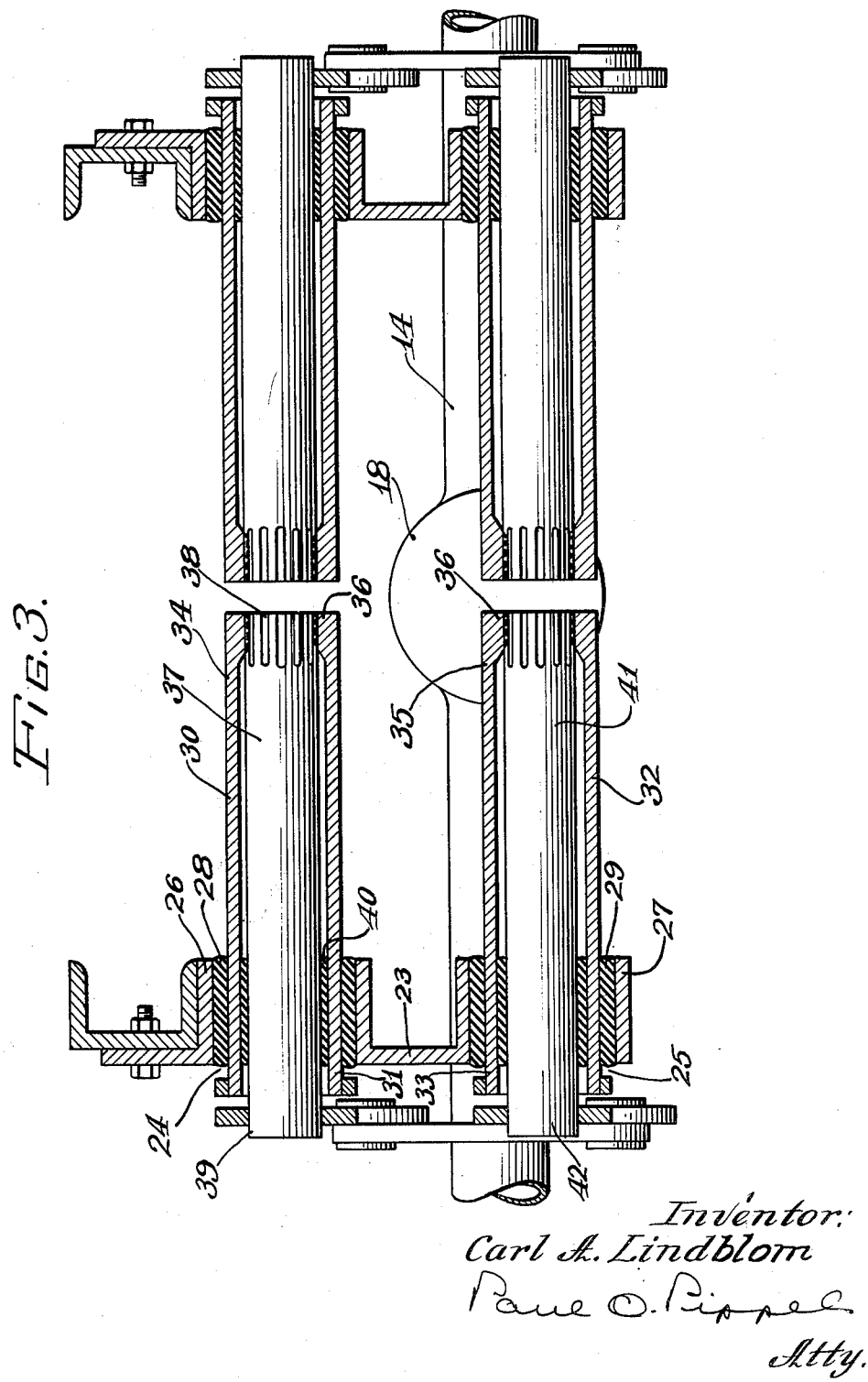

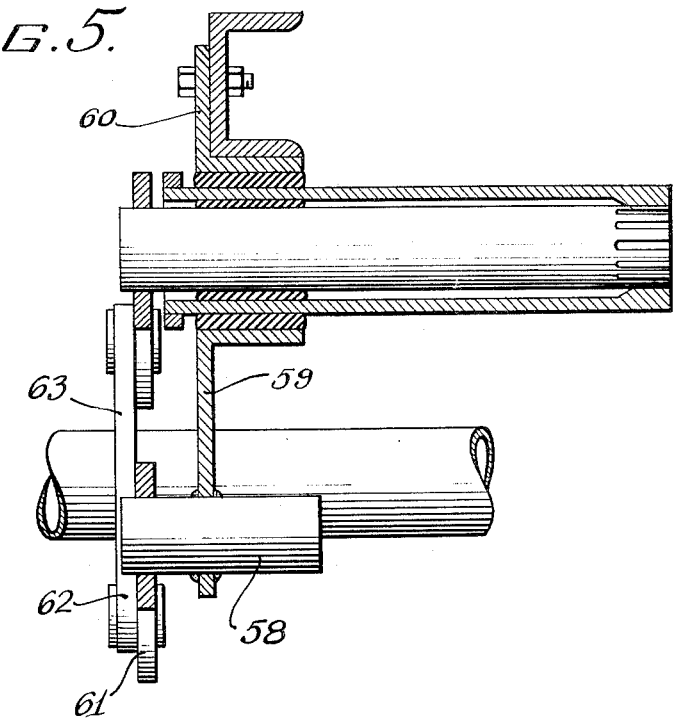
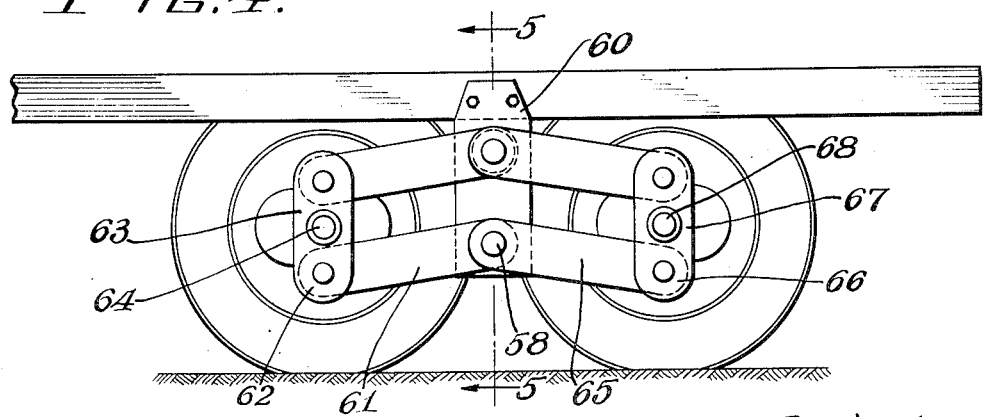

2,665,141

UNITED STATES PATENT OFFICE 2,665,141

TANDEM AXLE SUSPENSION

Carl A. Lindblom, Auburn, Ind., assignor to International Harvester Company, a corporation of New Jersey Application September 29, 1950, Serial No. 187,507

9 Claims. (Cl. 280—104.5)

This invention relates to a new and improved resilient suspension mechanism for tandem axle vehicles and more particularly to a resilient suspension system employing torsion springs arranged in a novel fashion for springing the vehicle frame from the tandem axles.

The primary object of the present invention is the provision of an improved construction and arrangement of tandem axle suspension springs by virtue of which the load is effectively equalized between the two axles. The assembly contemplates the utilization of a relatively few number of parts having a weight considerably less than similar structures hitherto known with the result that the pay-load capacity of the vehicle is proportionately increased.

A further object is to provide a transversely disposed, torsionally resilient mechanism on each side of the vehicle frame for springing the axle ends adjacent the related side.

Another object is to provide a torsion spring device which includes a torsion rod substantially enclosed within a transversely disposed torsion tube.

Still another object is the provision of a torsion tube and rod spring assembly for pivotally connecting the axles to the vehicle frame without the need of heavy conventional leaf springs and thus materially decrease the weight of the suspension mechanism.

A further object is the provision of resilient, non-metallic means between the torsion tubes and the vehicle chassis and between the torsion tubes and their associated torsion ends.

The foregoing and other important objects and desirable features inherent in and encompassed by the invention together with many of the purposes and uses thereof, will become readily apparent from a reading of the ensuing description in conjunction with the annexed drawings, in which:

Fig. 1 is a plan view of the rear end of a chassis embodying the present invention;

Fig. 2 is a side elevational view taken substantially along the line 2—2 of Fig. 1;

Fig. 3 is a rear elevational view taken substantially along the line 3—3 of Fig. 1;

Fig. 4 is a side elevational view similar to Fig. 2 showing a modified form of the invention; and Fig. 5 is an enlarged fragmentary rear elevational view, taken generally along line 5—5 of Fig. 4, of one side of a vehicle chassis.

Referring to the drawings, in which like reference characters designate like elements throughout the various views, there is shown the rear portion of a vehicle main frame designated generally by numeral 10. The frame 10 includes a pair of longitudinally extending transversely spaced side sill members 11 and 12 which are cross-connected by means of cross members and braces (not shown) in a conventional manner.

The rear portion of the main frame 10 is carried on a pair of transversely disposed, parallel axles or axle housings 13 and 14. The axles 13, 14 in turn are supported by two sets of ground engaging wheels 15, 16 (one set for each axle) which are suitably mounted on the axles for rotation. It is to be understood that either one or both sets of wheels 15, 16 are capable of being drive wheels by receiving power from a differential mechanism (not shown) enclosed within differential housings 17, 18. The wheels 15, 16 are secured to the opposite ends of the shafts 19, 20 enclosed within the axles 13, 14, respectively, in the usual manner and the axle shafts are driven by the differential mechanisms.

In the following description, only one side of the rear portion of the vehicle frame 10 will be referred to inasmuch as both sides are provided with identical structure.

Rigidly connected to the side sill member 11 approximately midway between the axles 13 and 14 is a supporting bracket 21. Bracket 21 is fastened to the sill member 11 by a plurality of bolts 22. It will be noted that bracket 21 depends below the side sill member 11 and the depending portion 23 is provided with a pair of vertically alined openings 24 and 25 therethrough. A bearing member 26 in the form of a hollow cylinder projects inwardly of opening 24. Lower opening 25 is provided with a similar bearing member 27. Bearing members 26 and 27 may be integrally formed on the supporting bracket 21 as shown in Fig. 3 or fastened to the bracket by any suitable means as welding or the like.

A cylindrical bushing or ring 28, formed of rubber or other non-metallic resilient material, fills the hollow cylindrical interior of the bearing member 26 and has its outer surface bonded or otherwise secured to the cylindrical interior surface of the bearing member 26. A like bushing 29 is mounted within bearing member 27. Both bushings 28 and 29 are provided with central openings.

Projecting through the upper opening 24 is a hollow torsion tube 30. Torsion tube 30 extends transversely to a point approximately midway between the side sill members 11 and 12 as shown in Fig. 3. It will be apparent that only a short portion 31 of the torsion tube 30 projects outwardly of the sill member 11. The interior surface of the bushing 28 is bonded or otherwise secured to the outer surface of the torsion tube 30. A lower torsion tube 32, having the same structural characteristics as the upper tube 30, is mounted in the lower bushing 29 whereby a short portion 33 extends transversely from the side sill member 11. The inwardly disposed ends 34 and 35 of the tubes 30 and 32, respectively, are provided with internal splines 36, the purpose of which will be explained hereinafter.

Positioned within the upper torsion tube 30 is a coaxial torsion rod 37 having external splines 38 formed on its inner end adapted to mate with the internal splines 36 of the tube. It will be evident by this connection that the inner ends of the tube and rod are prevented from rotating relative to each other while their outer ends may rock relative to each other against the torsional resistance of the tube and rod. The outer end 39 of the rod 37 projects transversely from the short portion 31 of the tube 30. A resilient bushing 40, similar to bushing 28, is interposed between the interior surface of the tube 30 and the exterior surface of the rod 37 and is secured thereto by bonding or the like. A lower torsion rod 41 is mounted within the torsion tube 32 in a like manner and has its outer end 42 vertically spaced below the outer end 39 of torsion rod 37.

Fastened to the outer end or short portion 31 of the upper torsion tube 30 is a forwardly extending arm or lever 43. The forward axle 13 has a bracket 44 secured adjacent each end thereof. Each bracket 44 has an upright ear 45 and a downwardly depending ear 46 formed thereon. The forwardmost end 47 of the arm 43 is pivotally connected to the upright ear 45 by means of a pin 48. The hub portion of a lower forwardly extending arm or lever 49 is rigidly connected to the outer end 33 of the lower torsion tube 32. The end 50 opposite the hub portion is pivotally connected to the downwardly depending ear 46 by pin 51'. Rigidly attached adjacent each end of the rear axle 14 is a bracket 51. Brackets 51 are each provided with an upper ear 52 and a lower ear 53. An upper rearwardly extending arm 54 has its hub portion connected to the outer end 39 of the upper torsion rod 37 and its opposite end pivotally attached to the upper ear 52 of bracket 51 by means of pivot pin 55. Similarly, a lower rearwardly extending arm 56 has one end pivotally connected to the lower ear 53 by pin 57 and its opposite or hub portion end rigidly connected to the outer end 42 of the lower torsion rod 41.

Although the illustration of the invention herein is generally diagrammatic, it is thought that the structure thereof will be clear to those skilled in the art. In operation, relative deflection between the frame 10 and the axles 13 and 14, as when the vehicle is at a stand still and a load placed thereon, is resiliently resisted by the torsion tube and rod arrangement described above. The weight of the load will cause supporting brackets 21 to move downwardly carrying torsion tubes 30 and 32 therewith. Inasmuch as the forwardly extending arms 43 and 49 have one end rigidly connected to the torsion tubes 30 and 32, respectively, and their opposite ends pivotally connected to the forward axle 13, downward movement of the frame 10 tends to rotate torsion tubes 30 and 32 in a clockwise direction as viewed in Fig. 2, relative to the supporting brackets 21. The rearwardly extending arms 54 and 56, on the other hand, having one end rigidly attached to the torsion rods 37 and 41, respectively, rock in a counterclockwise direction. It will be appreciated that since the innermost end of each torsion tube is splined to the innermost end of one of torsion rods relative rotation between the ends is prevented and the outermost ends of the torsion tubes and rods rotate in opposite directions with the result that torque of the torsion tube is opposed by the torque of the torsion rod. The torsion tubes 30, 32 and rods 37 and 41 are chosen so as to be capable of twisting sufficiently to provide the necessary resilient yield between the axles 13 and 14 and the frame 10. It will also be noted that the rubber bushings interposed between the bearing members and the torsion tubes and between the torsion tubes and rod yield torsionally when the tube and rods twist relative to each other to add to the total yielding resistance afforded by the suspension arrangement.

In the event that the wheels 15 on the axle 13 encounter uneven terrain ahead of the wheels 16 on the axle 14, arms 43 and 49 will be rocked upwardly. This movement of the arms 43, 49 will react on the rear axle 13 through the torsion tubes and rods, thus transferring to the rear axle its proportionate share of the load. The reaction is reversed when the forward wheels 15 level out and the rearward wheels 16 encounter the uneven spot just passed over by the forward wheels. That is, the twisting movement of the torsion rods is opposed by an opposite twisting of the torsion tubes.

Inasmuch as the torsion tubes as well as the torsion rods are capable of twisting the effect of connecting one end of a tube to one end of an enclosed rod is to provide a torsion spring having a length equal to the length of the rod and the tube. It will be appreciated that an inexpensive, compact suspension arrangement is possible with the present invention by eliminating the need of costly, complex mounting members that are usually necessary for the support of a unitary torsion spring having the same resilient characteristics of the suspension system constituting the present invention.

Figs. 4 and 5 represent a modification of the above described structure. The modification is essentially the same as the suspension system hereinbefore described with the exception that the lowermost torsion tubes and rods on each side of the vehicle are eliminated and in lieu thereof mounting pins 58 (one of which is shown) are rigidly held in the depending portions 59 of the brackets 60, which brackets are similar to brackets 21. A lower forwardly extending arm 61 has one end pivotally supported on pin 58 and its opposite end pivotally attached to an ear portion 62 of a bracket 63 rigidly connected to the forward axle 64. A rearwardly extending arm 65 is similarly connected to mounting pin 58 and an ear portion 66 of a bracket 67 attached to the rear axle 68. It will be apparent that the modified axle suspension will be less costly to manufacture and be adequate where the axle loading anticipated is relatively small.

The embodiments of the invention chosen for the purposes of illustration and description herein are those preferred as the result of selective tests based upon requirements for achieving the objects of the invention and developing the utility thereof in the most desirable manner, due regard being had to existing factors of economy, simplicity of design and construction, production methods and the improvements sought to be effected. It will be appreciated, therefore, that the particular structural and functional aspects emphasized herein are not intended to exclude, but rather to suggest, such other adaptations and modifications of the invention as fall within the spirit and scope of the invention as defined in the appended claims.

What is claimed is:

1. A tandem axle vehicle suspension between a vehicle frame having parallel, transversely spaced longitudinal sill members and a tandem axle unit including transversely disposed axle housings below said frame; a bracket secured to the outer ends of each axle housing one each of said brackets having an upwardly projecting ear and a downwardly projecting ear; a supporting bracket rigidly connected to each sill member having a portion depending downwardly below said frame between said axle housings, said depending portion being provided with an aperture; a pair of alined, transversely disposed torsion tubes, each tube extending through the aperture of one of said supporting brackets and having a relatively short portion projecting outwardly of the frame and a relatively long portion extending substantially to the longitudinal median line of the frame, the inwardly disposed ends of said long portions being provided with internal splines; resilient cushioning means interposed between each of said torsion tubes and its respective supporting bracket; a torsion rod enclosed within each torsion tube having its inner end provided with external splines adapted to engage the internal splines of the tube associated therewith, said rods having their outer ends projecting from said torsion tubes; resilient cushioning means interposed between said torsion tubes and said torsion rods; a pair of transversely spaced first upper arms, each of said arms having one end rigidly connected to the short portion of one of said torsion tubes, said arms extending in a longitudinal direction toward one of said axle housings; a pair of transversely spaced second upper arms, each of said arms having one end rigidly connected to the outer end of one of said torsion rods and extending in a longitudinal direction opposite to that of said first upper arms toward said other axle housing; and means pivotally connecting said first upper arms to the upwardly projecting ears of the brackets secured to one axle housing and said second upper arms to the upwardly projecting ears of the brackets secured to the other axle housing.

2. The combination as set forth in claim 1 in which the depending portions of each of said supporting brackets has a lower aperture vertically spaced below said first mentioned aperture formed therein; a second pair of aligned, transversely disposed torsion tubes, each tube extending through the lower aperture of one of said supporting brackets and having a relatively short portion projecting outwardly of the frame and a relatively long portion extending substantially to the longitudinal median line of the frame, the inwardly disposed ends of said long portions being provided with internal splines; resilient cushioning means interposed between each of said second pair of torsion tubes and its respective supporting bracket; a torsion rod enclosed within each of said second pair of torsion tubes having its inner end provided with external splines adapted to engage the internal splines of the tube associated therewith, said rods having their outer ends projecting from said torsion tubes; resilient cushioning means interposed between said second pair of torsion tubes and said torsion rods; a pair of transversely spaced first lower arms, each of said arms having one end rigidly connected to the short portion of one of said second pair of torsion tubes, said arms extending in a longitudinal direction toward one of said axle housings; a pair of transversely spaced second lower arms, each of said arms having one end rigidly connected to the outer end of one of said second pair of torsion rods and extending in a longitudinal direction opposite to that of said first lower arms toward said other axle housing; and means pivotally connecting said first lower arms to the downwardly projecting ears of the brackets secured to one axle housing and said second lower arms to the downwardly projecting ears of the brackets secured to the other axle housing.

3. The combination as set forth in claim 1 in which the depending portions of each of said supporting brackets is provided with a mounting pin vertically spaced below said aperture; a pair of transversely spaced first lower arms, each of said arms having one end rockably supported on one of said mounting pins and its opposite end pivotally connected to one of said downwardly projecting ears of said axle housing; and a pair of transversely spaced second lower arms, each of said arms having one end rockably supported on one of said mounting pins and its opposite end pivotally connected to one of said downwardly projecting ears of said other axle housing.

4. A tandem axle vehicle suspension between a vehicle frame having parallel, transversely spaced longitudinal sill members and a tandem axle unit including transversely disposed axle housings; a supporting bracket rigidly connected to each sill member having a portion depending downwardly below said frame between said axle housings, said depending portion being provided with an aperture; a pair of alined, transversely disposed torsion tubes, each tube extending through the aperture of one of said supporting brackets; resilient cushioning means interposed between each of said torsion tubes and its respective supporting bracket; a torsion rod enclosed within each torsion tube, each of said rods having one end rigidly connected to one end of one of said torsion tubes and its opposite end projecting transversely from the other end of the torsion tube; resilient cushioning means interposed between said torsion tubes and said torsion rods; a pair of transversely spaced first arms, each of said arms having one end rigidly connected to one end of one of said torsion tubes and having its opposite end pivotally connected to one of said axle housings; and a pair of transversely spaced second arms, each of said second arms having one end rigidly connected to the transversely projecting end of one of said torsion rods and having its opposite end pivotally connected to the other of said axle housings.

5. Suspension means for a vehicle having a longitudinal frame and a pair of longitudinally spaced axles below the frame, the combination with said frame and said axles comprising a bracket secured to said frame having an aperture formed therein; a transversely disposed torsion tube extending through said aperture; resilient cushioning means interposed between said torsion tube and said bracket; a torsion rod enclosed within said torsion tube, said rod having one end rigidly connected to said torsion tube and its opposite end projecting transversely from said torsion tube; a first arm having one end rigidly connected to said torsion tube and its opposite end pivotally connected to one of said axles; and a second arm having one end rigidly connected to said torsion rod and its opposite end pivotally connected to the other of said axles.

6. The combination as set forth in claim 5 in which said bracket has a lower aperture vertically spaced below said first mentioned aperture; a second transversely disposed torsion tube extending through said lower aperture; resilient cushioning means interposed between said second torsion tube and said bracket; a torsion rod enclosed within said second torsion tube having one end rigidly connected to said torsion tube and its opposite end projecting transversely from said torsion tube; a first lower arm having one end rigidly connected to said second torsion tube and its opposite end pivotally connected to one of said axles; and a second lower arm having one end rigidly connected to said second torsion rod and its opposite end pivotally connected to the other of said axles.

7. The structure applied to each side of the frame of a tandem axle vehicle for springing the frame from the tandem axles, comprising: a first pair of coaxial levers supported from the frame for rocking movement about an axis generally transversely of and below the frame; torsion spring means disposed along the rocking axis of said levers having one end connected to a hub of one lever and its other end connected to a hub of the other lever; means pivotally connecting each lever to one of said axles; a second pair of coaxial levers supported from the frame for rocking movement about an axis vertically spaced below and parallel to the rocking axis of said first pair of levers; and means pivotally connecting one end of each of said second pair of levers to an axle.

8. The combination as set forth in claim 7 in which second torsion spring means are disposed along the rocking axis of said second pair of levers, said second spring means having one end connected to a hub of one of said second pair of levers and its other end connected to a hub of the other of said second pair of levers.

9. The combination as set forth in claim 7 in which a mounting pin is disposed along the rocking axis of said second pair of levers, the hub of each of said second levers being pivotally connected to said mounting pin.

CARL A. LINDBLOM.

References Cited in the file of this patent

UNITED STATES PATENTS

| Number | Name | Date |
|---|---|---|
| 1,964,735 | Knox et al. | July 3, 1934 |
| 2,051,864 | Knox | Aug. 25, 1936 |
| 2,461,867 | Avila | Feb. 15, 1949 |
| 2,480,934 | Julien | Sept. 6, 1949 |

FOREIGN PATENTS

| Number | Country | Date |
|---|---|---|
| 225,687 | Switzerland | May 17, 1943 |